(12) United States Patent
Chan et al.

(10) Patent No.: US 12,153,684 B2
(45) Date of Patent: Nov. 26, 2024

(54) SOURCE CODE VULNERABILITY DETECTION AND REPAIR THROUGH MACHINE LEARNING

(71) Applicant: MICROSOFT TECHNOLOGY LICENSING, LLC., Redmond, WA (US)

(72) Inventors: Aaron Yue-Chiu Chan, Provo, UT (US); Colin Bruce Clement, Seattle, WA (US); Yevhen Mohylevskyy, Redmond, WA (US); Neelakantan Sundaresan, Bellevue, WA (US); Roshanak Zilouchian Moghaddam, Kirkland, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 124 days.

(21) Appl. No.: 17/949,589

(22) Filed: Sep. 21, 2022

(65) Prior Publication Data
US 2024/0028740 A1 Jan. 25, 2024

Related U.S. Application Data

(60) Provisional application No. 63/391,687, filed on Jul. 22, 2022.

(51) Int. Cl.
*G06F 21/57* (2013.01)
(52) U.S. Cl.
CPC ...... *G06F 21/577* (2013.01); *G06F 2221/034* (2013.01)

(58) Field of Classification Search
CPC ..................................................... G06F 21/577
See application file for complete search history.

(56) References Cited

U.S. PATENT DOCUMENTS

| | | | |
|---|---|---|---|
| 11,381,590 B2 * | 7/2022 | Alsaeed | G06N 5/04 |
| 11,526,424 B2 | 12/2022 | Deng | |
| 2006/0191010 A1 * | 8/2006 | Benjamin | G06F 21/552 |
| | | | 726/23 |

(Continued)

FOREIGN PATENT DOCUMENTS

WO 2021231007 A1 11/2021

OTHER PUBLICATIONS

Lutellier, et al., "ENCORE: Ensemble Learning using Convolution Neural Machine Translation for Automatic Program Repair", In Repository of arXiv:1906.08691v1, Jun. 20, 2019, pp. 1-18.

(Continued)

*Primary Examiner* — Bradley W Holder

(57) ABSTRACT

A neural classifier model is used to detect cybersecurity vulnerabilities in the source code predicted by a deep learning code generation model having been trained on source code possibly containing security bugs. Upon the classifier model classifying a given source code snippet as likely containing a cybersecurity vulnerability, a proposed repair for the cybersecurity vulnerability is predicted from a neural decoder transformer model having been trained on non-vulnerable source code. The neural decoder transformer model is used to predict source code that repairs the cybersecurity vulnerability given the source code classified with a cybersecurity vulnerability.

20 Claims, 11 Drawing Sheets

(56) References Cited

U.S. PATENT DOCUMENTS

| | | | |
|---|---|---|---|
| 2020/0057858 A1* | 2/2020 | Sharma | G06F 21/563 |
| 2021/0157926 A1* | 5/2021 | Handurukande | G06F 21/563 |
| 2022/0083450 A1 | 3/2022 | Geddes et al. | |
| 2023/0177170 A1 | 6/2023 | Olson | |

OTHER PUBLICATIONS

"International Search Report and Written Opinion Issued in PCT Application No. PCT/US23/025487", Mailed Date: Sep. 7, 2023, 14 Pages.

Aghaei, et al., "Threatzoom: CVE2CWE using Hierarchical Neural Network", In Repository of arXiv:2009.11501v1, Sep. 24, 2020, 19 Pages.

Bhandari, et al., "CVEfixes: Automated Collection of Vulnerabilities and Their Fixes from Open-Source Software", In Repository of arXiv:2107.08760v1, Jul. 19, 2021, 10 Pages.

Das, et al., "V2W-BERT: A Framework for Effective Hierarchical Multiclass Classification of Software Vulnerabilities", In Repository of arXiv:2102.11498v1, Feb. 23, 2021, 11 Pages.

Devlin, et al., "BERT: Pre-training of Deep Bidirectional Transformers for Language Understanding", In Repository of arXiv:1810.04805v2, May 24, 2019, 16 Pages.

Pearce, et al., "Asleep at the Keyboard? Assessing the Security of Github Copilot's Code Contributions", In Repository of arXiv:2108.09293v3, Dec. 16, 2021, 15 Pages.

Pearce, et al., "Can OpenAI Codex and Other Large Language Models Help US Fix Security Bugs?", In Repository of arXiv:2112.02125v1, Dec. 3, 2021, 16 Pages.

Sangaroonsilp, et al., "Common Privacy Weaknesses and Vulnerabilities in Software Applications", In Repository of arXiv:2112.13997v1, Dec. 28, 2021, 18 Pages.

Vaswani, et al., "Attention Is All You Need", In Repository of arXiv:1706.03762v5, Dec. 6, 2017, 15 Pages.

Verdi, et al., "An Empirical Study of C++ Vulnerabilities in Crowd-Sourced Code Examples", In Repository of arXiv:1910.01321v2, Jan. 19, 2021, 19 Pages.

Chan, et al., "Transformer-based Vulnerability Detection in Code at EditTime: Zero-shot, Few-shot, or Fine-tuning?", arXiv:2306.01754v1, May 23, 2023, 10 pages.

International Search Report and Written Opinion received for PCT Application No. PCT/US2024/032331, mailed on Oct. 9, 2024, 12 pages.

* cited by examiner

SOURCE CODE VULNERABILITY DETECTION AND REPAIR THROUGH MACHINE LEARNING

CROSS-REFERENCE TO RELATED APPLICATION

The present application claims the benefit of the earlier filed provisional application having Ser. No. 63/391,687 filed on Jul. 22, 2022, which is incorporated by reference in its entirety.

BACKGROUND

Machine learning models are often used to recognize, predict, and generate natural language based on large training datasets of text-based data. These models are used often to solve a variety of problems such as question answering, document summarization, machine translation, and reading comprehension. Machine learning models are statistical models trained to learn to recognize patterns in source code and to make predictions. A drawback of these models is the extensive amount of real-world data needed to train or generate such models consisting of several million data samples which are mined from various sources. Another drawback is the reliance of these models on the quality of the data provided to train them.

Machine learning models are often used for software engineering tasks where source code is generated for tasks such as code completion, documentation generation, code search, and source code generation. These models may be trained from source code extracted from public source code repositories or crowd-sourced websites. The source code obtained from these sources may contain software vulnerabilities which have high-risk cybersecurity weaknesses. The use of such source code in the training dataset of the model is likely to result in the model learning to generate source code containing cybersecurity vulnerabilities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A vulnerability detection and repair system use a classifier model to detect cybersecurity vulnerabilities in the source code generated from a deep learning code generation model having been trained on source code possibly containing cybersecurity vulnerabilities. In one aspect, the classifier model is a neural encoder transformer model with attention trained to recognize some of the cybersecurity vulnerabilities from the Common Vulnerabilities and Exposure (CVE) list and the Common Weakness Enumeration (CWE) list of software vulnerabilities and weaknesses.

Upon the classifier model classifying a given source code snippet as likely containing a cybersecurity vulnerability, a proposed repair for the cybersecurity vulnerability is predicted from a neural decoder transformer model. The neural decoder transformer model is used to predict source code that repairs the cybersecurity vulnerability given the source code classified with a particular type of cybersecurity vulnerability.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
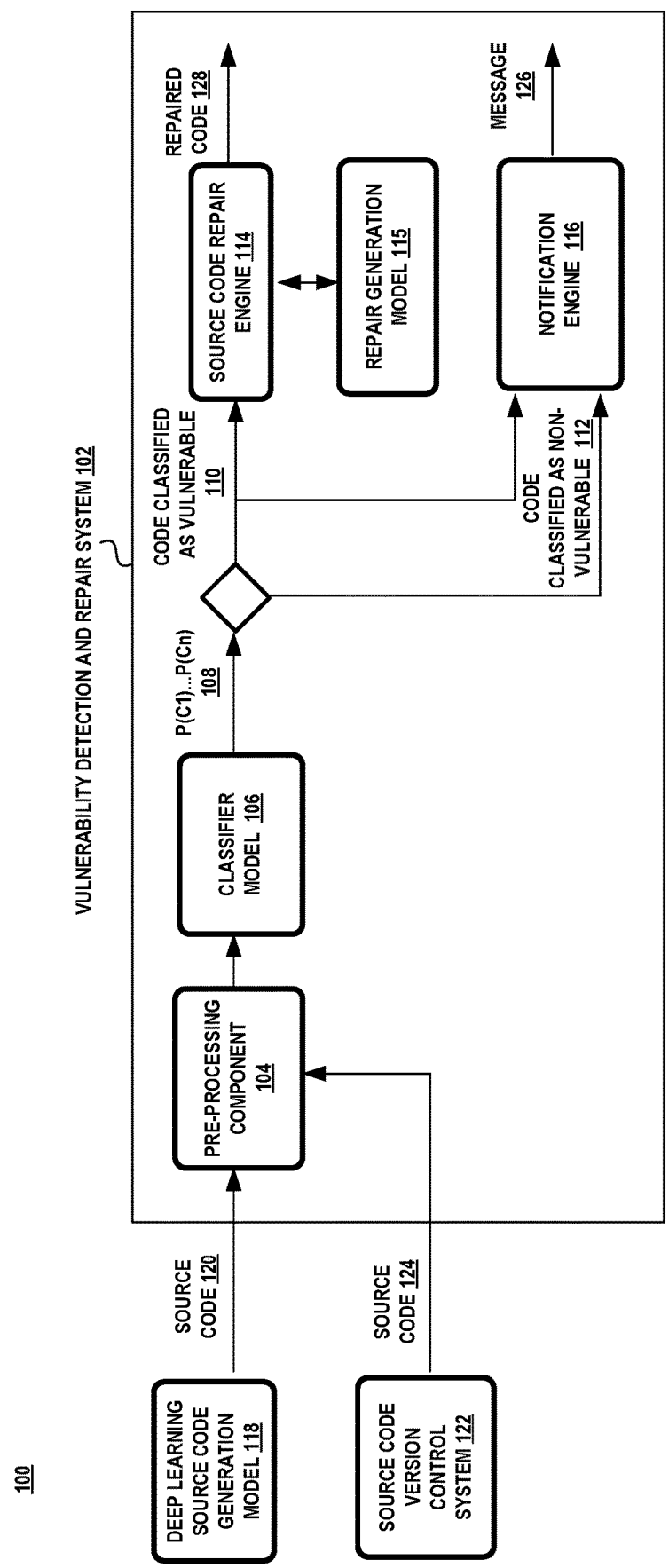
FIG. 1 is a schematic diagram illustrating an exemplary vulnerability detection and repair system.

The present disclosure relates to the detection of cybersecurity vulnerabilities in source code generated from a deep learning machine learning model. A cybersecurity vulnerability is a flaw in a source code program that leads a third-party to gain access to a system or network associated with the source code and/or control the system or network. A software cybersecurity vulnerability differs from syntax errors, buffer overflow, null pointer dereferences, and thread safety violations. In one aspect, a software cybersecurity vulnerability is a software weakness listed in the CWE list (www.cwe.org) and/or a cybersecurity vulnerability listed in the Common Vulnerabilities and Exposures (CVE) list (www.cve.org). The CVE list includes publicly-disclosed software cybersecurity vulnerabilities. The CWE list includes known software weaknesses. A software weakness is an error that can lead to a software vulnerability.

A machine learning classifier model is trained to detect software cybersecurity vulnerabilities in the source code generated from a deep learning machine learning model. A deep learning machine learning model differs from traditional machine learning models that do not use neural networks. Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes statistical techniques, data mining, Bayesian networks, Markov models, clustering, support vector machine, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. There are various types of deep learning models that generate source code, such as recurrent neural network (RNN) models, convolutional neural network (CNN) models, long short-term memory (LSTM) models, and neural transformers.

In one aspect, the classifier model is a neural encoder transformer model pre-trained on an unsupervised dataset of source code samples and fine-tuned on a supervised dataset of labeled samples of source code containing vulnerable and non-vulnerable source code. The neural encoder transformer model is trained to identify the likelihood that the source code predicted or inferred from a deep learning model contains a cybersecurity vulnerable, such as the CVE and CWE vulnerabilities. In the case where the neural encoder transformer identifies vulnerable source code, a neural decoder transformer model is used to predict a repair for the vulnerable source code.

Attention now turns to a more detailed description of the system, method, and components used in the vulnerability detection and repair system.

System

FIG. 1 illustrates an exemplary system 100 utilizing a vulnerability detection and repair system 102. In an aspect, the vulnerability detection and repair system 102 includes a pre-processing component 104, a classifier model 106, a source code repair engine 114, a repair generation model 115, and a notification engine 116. In one aspect, the vulnerability detection and repair system 102 receives source code 120 output from a deep learning code generation model 118 and in another aspect, the system 102 receives source code 124 from a source code version control system 122.

The deep learning code generation model 118 is trained to predict or generate source code for a variety of tasks, such as code completion, code documentation, code search, and the like. These tasks require an understanding of source code. Source code differs from a natural language (e.g., English) since programmers use, at times, arbitrary, complex and long names to represent a variable, function or other code elements. Source code can be learned from a large unsupervised abundant corpus of code snippets from different programming languages and/or from natural language code summaries from which the model learns statistical properties of the source code, such as syntactic rules of the programming languages, as well as semantic information from co-occurrence of specific variable and method names.

The source code version control system 122 is responsible for managing changes made to source code programs and other documents stored in a source code repository. The source code version control system 122 may be a file archive and web hosting facility that stores large amounts of source code either privately or publicly. The source code programs residing in the source code repositories vary and are written in different programming languages. The selected source code programs come from different domains, such as without limitation, scientific computing, web development, dataflow programming, machine learning, and the like.

Changes to the source code programs in the source code version control system 122 are initiated through a pull request. A pull request is a request to initiate the process of integrating new source code changes into a version of the source code program stored in the source code repository. The process includes notification to other developers associated with the source code program of the proposed changes in order to seek review of the changes from other developers. The vulnerability detection and repair system 102 interacts with the source code version control system 122 to review the proposed changes for cybersecurity vulnerabilities that may be present in the proposed changes.

The pre-processing component 104 processes the source code that is output from the deep learning code generation model 118 into a syntactically-correct source code snippet. In some situations, the source code output from the deep learning code generation model 118 may not be syntactically correct and may be missing a closing parenthesis, bracket, or other such code elements. The pre-processing component 104 parses the source code output from the model 118 and converts the code into a syntactically-correct and compliable source code snippet. The processed source code is then parsed and tokenized into an input embedding sequence that is input to the classifier model 106.

The classifier model 106 receives the input embedding sequence and generates a set of probabilities $P(C_1) \ldots P(C_n)$ indicating the likelihood that the source code contains one or more of the cybersecurity vulnerabilities classes $C_1, \ldots, C_n$ 108. In one aspect, the classifier model is trained to identify a particular set of CWE and/or CVE software weaknesses or vulnerabilities. It should be noted that the term cybersecurity vulnerability includes both the CWE weaknesses and the CVE cybersecurity vulnerabilities.

The notification engine 116 generates a message 126 indicating whether the source code contains vulnerable source code 110 or non-vulnerable source code 112. Additionally, the source code repair engine 114 generates a suggested repair 128 for the source code classified as vulnerable 110 using a repair generation model 115.

Figure 2A:
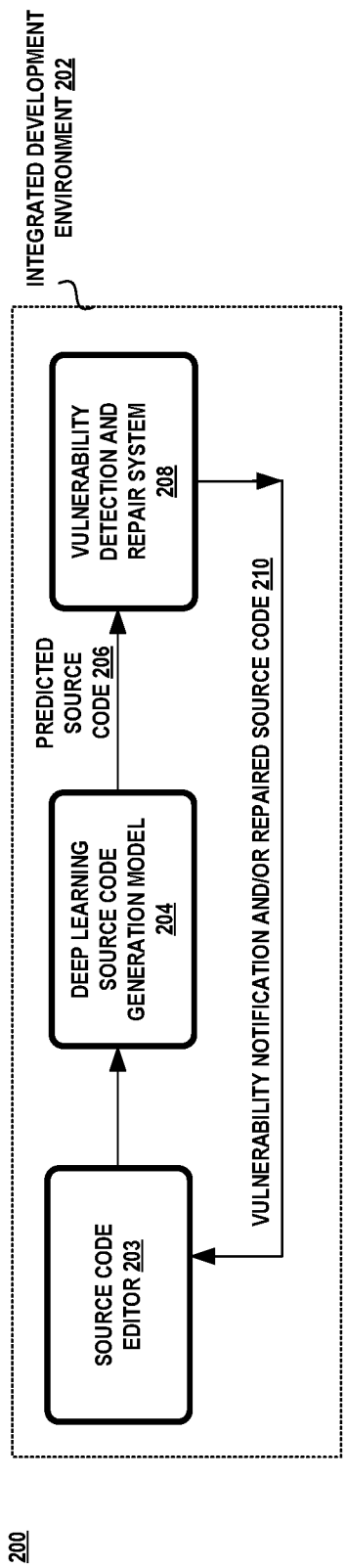
FIGS. 2A-2B are schematic diagrams illustrating exemplary applications of the vulnerability detection and repair system.
Figure 2B:
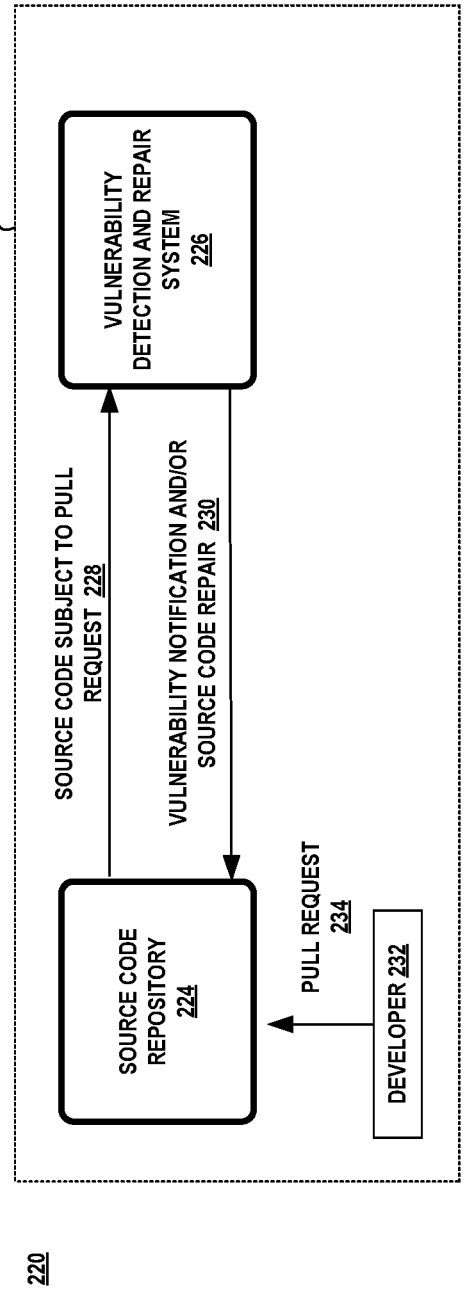

FIGS. 2A and 2B illustrate exemplary systems utilizing the vulnerability detection and repair system. Turning to FIG. 2A, there is shown a system 200 where the vulnerability detection and repair system 208 operates within an IDE 202. The IDE 202 is a software development tool that provides tools for software development, such as without limitation, source code editors, compilers, debuggers, build automation tools, and the like. The IDE 202 may incorporate a code completion tool that attempts to predict the next string of characters that a developer (e.g., user, end-user, programmer, etc.) may type into a source code editor. Source code may consist of various elements (e.g., keywords, delimiters, variables, methods, constants, operators, etc.) that are combined in a particular order in accordance with the grammar of the underlying programming language to form an expression that is used in a program statement. The deep learning source code generation model 204 receives a request from a source code editor 203 to complete a partially-formed source code snippet given a context of the partially-formed source code snippet and outputs a predicted source code snippet 206 that completes the partially-formed source code snippet.

A partially-formed source code snippet may include a partially-formed line of source code, expression, statement, method signature, method body, and the like. The vulnerability detection and repair system 208 analyzes the predicted source code snippet 206 for software cybersecurity vulnerabilities and generates a repair for the cybersecurity vulnerability. A vulnerability notification is sent to the source code editor 203 along with a repaired source code snippet, if vulnerable code is detected 210.

FIG. 2B illustrates a system 220 where the vulnerability detection and repair system 226 operates with a source code version control system 222 to identify cybersecurity vulnerabilities in the source code of a pull request 234 submitted by a developer 232. The source code version control system 222 detects a pull request and initiates a request 228 for the vulnerability detection and repair system 226 to analyze the source code subject to the pull request 234 for a software cybersecurity vulnerability. The system 220 notifies the source code repository 224 of its findings and returns a suggested repair upon finding a software cybersecurity vulnerability 230.

Attention now turns to a more detailed description of the classifier model. In one embodiment, the classifier model is constructed as a neural encoder transformer with attention. The neural encoder transformer with attention is better suited for classification tasks due to the type of attention used in the encoder. The encoder uses bi-directional attention which enables the encoder to learn the relationships of the tokens/subtokens in an input sequence both before and after their occurrence. Classifiers are trained to interpret a model's internal representation into a class label. Since bi-directional attention allows the model's internal representation to depend on all other subtokens, and not just the previous subtokens, bi-directional attention leads to superior classification performance.

It should be noted that the phrase neural encoder transformer and neural encoder transformer model, neural encoder transformer with attention are used interchangeably.

Neural Encoder Transformer Model

Figure 3:
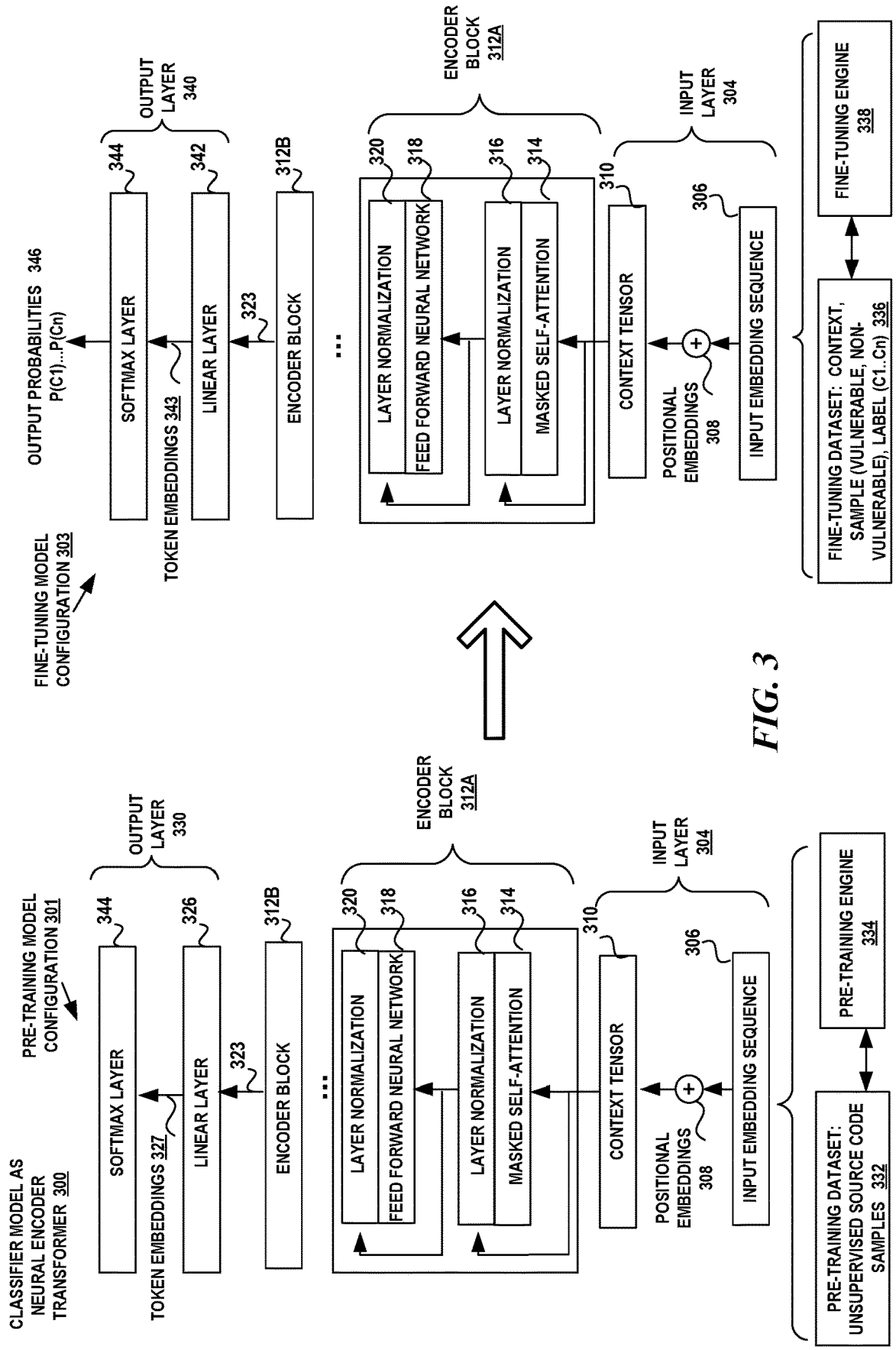
FIG. 3 is a schematic diagram illustrating an exemplary configuration of the neural classifier model in the training and fine-tuning configurations.

FIG. 3 illustrates an exemplary neural encoder transformer model 300. In pre-training 301, the neural encoder transformer model learns to understand source code, the relationship between the different code elements, and the syntax of a programming language. The weights of the model (e.g., token/subtoken embeddings, attention weights (K,V,Q)) are initialized randomly and changed during pre-training based on the samples in the pre-training dataset 332. The weights of the model are optimized based on reducing a cost function. A pre-training engine 334 uses a pre-training dataset of unsupervised source code samples 332 to pre-train the model for the optimal weights. During fine-tuning 303, the weights computed from the pre-training are used as the initial weights and tuned for the fine-tuning task. A fine-tuning engine 338 uses a fine-tuning dataset 336 composed of vulnerable source code and non-vulnerable source code, a context associated with the code, and a label that identifies the class or type of the vulnerability.

The neural encoder transformer 301 includes an input layer 304, one or more encoder blocks 312, and an output layer 330. The input layer 304 includes input embeddings of an input sequence of the pre-training dataset 306 and positional embeddings 308 that represents an order of the tokens/subtokens in an input embedding sequence. The input embedding sequence 306 and the positional embeddings 308 are combined to form a context tensor 310.

An encoder block (312A-312B) consists of two layers. The first layer includes a masked self-attention component 314 followed by a layer normalization component 316. The second layer includes a feed-forward neural network 318 followed by a layer normalization component 320. The context tensor 310 is input into the masked self-attention layer 314 of the encoder block with a residual connection to layer normalization 316. The output of the layer normalization 316 is input to the feed-forward neural network 318 with another residual connection to layer normalization 320. The output of each encoder block (312A-312B) is a set of hidden representations 323. The set of hidden representations 323 is then sent through additional encoder blocks, if multiple encoder blocks exist.

Attention is used to decide which parts of the input sequence are important for each token/subtoken, especially when decoding long sequences since the encoder is limited to encoding a fixed-size vector. Attention mechanisms gather information about the relevant context of a given token/subtoken and then encode that context into a vector which represents the token/subtoken. It is used to identity the relationships between subtokens in the long sequence while ignoring other subtokens that do not have much bearing on a given prediction.

The masked self-attention component 314 takes a context tensor 310 and weighs the relevance of each token/subtoken represented in the context tensor to each other by generating attention weights for each token/subtoken in the input embedding sequence 306. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token/subtoken in a sequence, K is the vector representations of all tokens/subtokens in the sequence, and V is the vector representations of all the tokens/subtokens in the sequence.

The queries, keys and values are linearly projected h times in parallel with $d_v$ output values which are concatenated to a final value:

$$\text{MultiHead}(Q,K,V)=\text{Concat}(\text{head}_1, \ldots ,\text{head}_h)W^O,$$

where $\text{head}_i=\text{Attention}(QW_i^Q,KW_i^K,VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural encoder transformer, layer normalization is used between the layers. The layer normalization component normalizes the inputs across the features. The mean and standard deviation is computed across the feature dimensions. There is a first layer normalization 316 that precedes the feed-forward neural network 318 and a second layer normalization 320 that follows the feed-forward neural network 318. The feed-forward neural network 318 processes each output encoding separately. The output of the top encoder block is a set of attention vectors K and V 323 that represent the last hidden layer.

In the pre-training model configuration 301, the output layer includes a linear layer 326 from which the subtoken/token embeddings 323 are output and a softmax layer 328. For fine-tuning, the neural encoder transformer model contains the same structure as the pre-trained model configuration except for the addition of a different output layer 340. The output layer of the pre-trained model is replaced with a classification layer that learns a new weight matrix of dimension K×H from randomly-initialized values, where K is the number of classes in a downstream classification task and where H is the dimension of the output of last encoder block.

The output layer of the pre-trained model 330 is not used since its weight matrix is of a different size that may not contain the classes of the target classification task. Instead, the new output layer 340 is used which has the number of hidden units set to the number of classes K of the fine-tuning classification task with a softmax activation function 344. The predicted probability P for the j-th class given an output of last encoder block x and weight matrix W corresponding to the classification layer is as follows:

$P(y=j|x)=\exp(x^T W_j+b)/[\Sigma_{k=1...K} \exp(x^T W_k+b)]$, where K is the number of classes, W is the weight matrix of dimension K×H, H is the dimension of x, the output of last encoder block, and b is the bias value.

The output layer 340 consists of a linear layer 342 and a softmax layer 344. The linear layer 342 is a fully-connected neural network that projects the raw scores output by the last layer of the neural network into a logits vector. The softmax layer 344 applies the softmax function to the logits vector to compute a vector that represents the probability distribution 346 of the classes of the software cybersecurity vulnerabilities, $P(C_1), \ldots P(C_n)$. In one aspect, the classes represent a pre-configured number of CWE/CVE classes.

Selection of Non-Vulnerable Code for Training

The neural encoder transformer model is trained on vulnerable source code samples and non-vulnerable source code samples to learn the relationships between the code elements in both types of training samples in order to more precisely predict a vulnerability. The quality of the training samples effects the ability of the model to learn to make predictions especially on source code patterns not seen in the training samples. There is often a larger volume of non-vulnerable source code samples and a smaller number of vulnerable source code samples. In order to improve the quality of the predictions made by the classifier model, the non-vulnerable code samples used to train the classifier are those that are closely related to a vulnerable code sample. The similarity is based on embeddings generated by the neural encoder transformer model. This improves the false positive rate of the model, or the precision of the model, as it is trained to be more discriminating when given a non-vulnerable code snippet which is very similar to a vulnerable snippet. This allows the model to make better predictions by not filtering safe code as often.

Figure 4:
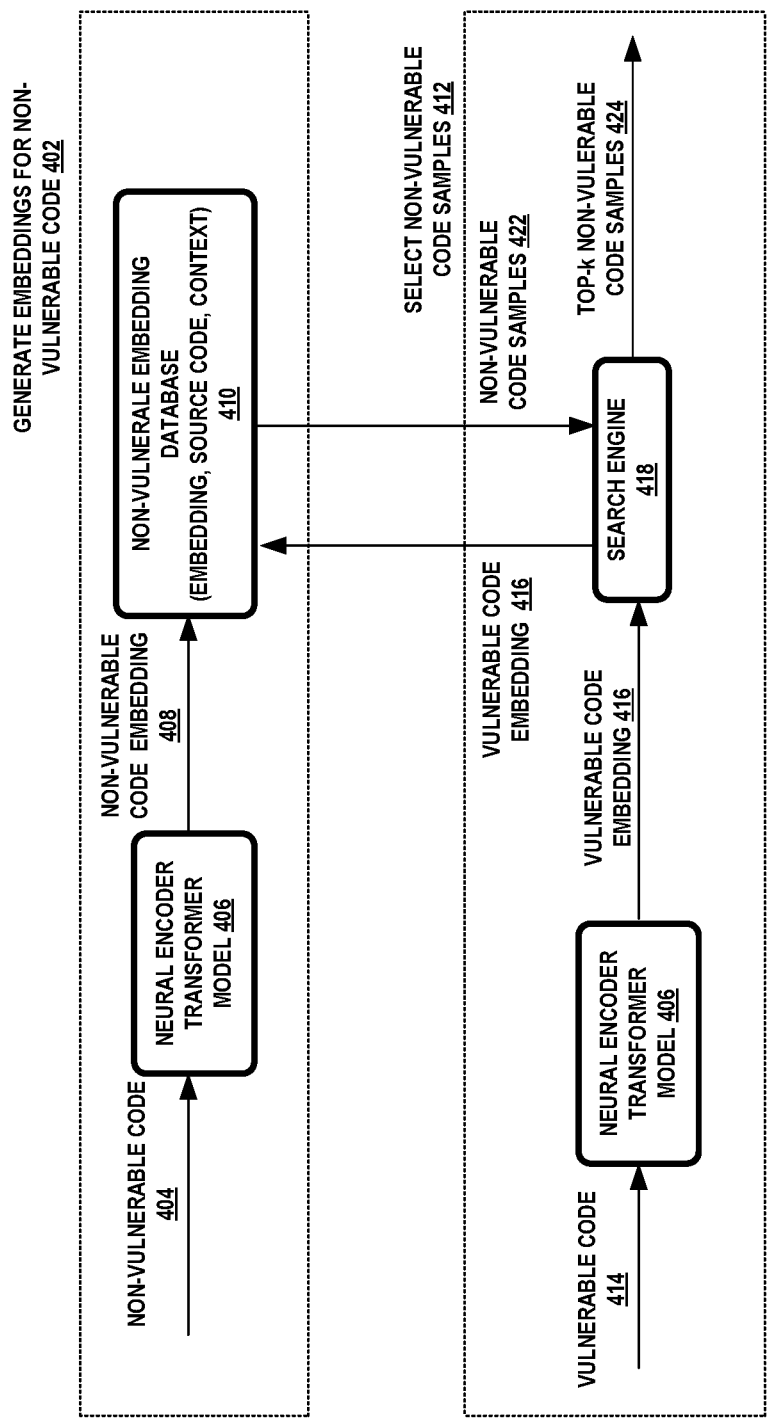
FIG. 4 is a schematic diagram illustrating a system that generates source code embeddings and selects certain non-vulnerable source code samples to train the neural classifier model based on an embedding similarity.
Figure 5:
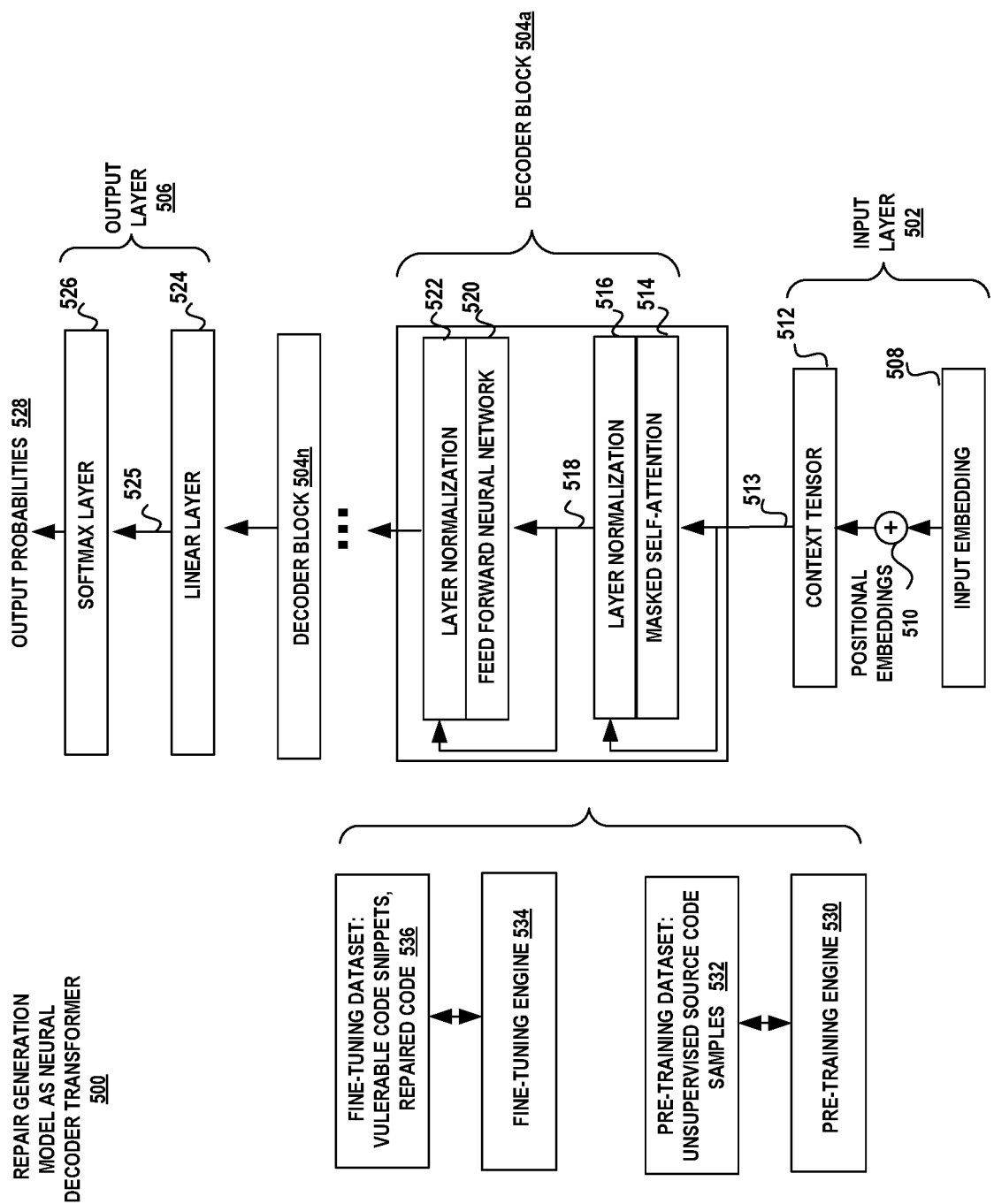
FIG. 5 is a schematic diagram illustrating an exemplary configuration of a neural decoder transformer model as a repair generation model.

Referring to FIG. 4, there is shown an exemplary system for generating 402 and selecting 412 the non-vulnerable code samples to train the neural encoder transformer model 400. Initially, the neural encoder transformer model 406 is used to generate embeddings 408 for each non-vulnerable source code sample 404 which is stored in a database 410 along with its corresponding source code and context. The context is the source code preceding the non-vulnerable source code sample 402. The pre-trained neural encoder transformer model or the fine-tuned neural encoder transformer model generates these embeddings 408.

To select a non-vulnerable source code sample, a vulnerable source code sample 414 is encoded into an embedding 416 using the neural encoder transformer model 406. A search engine 418 uses the embedding 416 of the vulnerable code source code sample to find the closest embeddings stored in the non-vulnerable embedding database 410. The corresponding non-vulnerable samples are retrieved. In one aspect, the search engine searches for the top-k non-vulnerable source code samples which are then used to train the neural encoder transformer model.

In one aspect, the search engine 418 uses an Approximate Nearest Neighbor (ANN) technique to find the top-k non-vulnerable source code samples, where k is a user-defined integer value. One such ANN technique is Approximate Nearest Neighbors Oh Yeah (ANNOY). The ANN techniques utilize a distance metric between the two embeddings to determine how close one embedding is to another. The distance metrics may be based on a Euclidean distance, cosine similarity, Hamming distance, and/or Manhattan distance.

The non-vulnerable embedding database 410 is constructed with an index tailored for efficiently searching for the closest similar embedding. The index is based on an embedding associated with a non-vulnerable source code sample. The indices in the database may be transformed into a tree in a pre-configured order and the search engine uses a tree traversal technique to search the tree to find the closest embeddings that are similar to the embedding of the vulnerable source codes sample.

Attention now turns to a more detailed discussion of the machine learning model used to generate the repair code.

Neural Decoder Transformer Model

In one embodiment, the source code repair engine is implemented as a neural decoder transformer model. The neural decoder transformer model is an auto-regressive model that produces an output one element at each time step based on the outputs of the previous time steps.

The decoder neural transformer model 500 includes an input layer 502, one or more decoder blocks 504a-504n, and an output layer 506. A decoder block 504 consists of two layers. The first layer includes a masked self-attention component 514 followed by a layer normalization component 516. The input to the masked self-attention component 514 has a residual connection to layer normalization 516. The output of layer normalization 518 is input into the feed-forward neural network 520 with a residual connection to layer normalization component 522. The output of the feed-forward neural network is input into layer normalization component 522.

Each token/subtoken flows through all the decoder blocks along its own path. The masked self-attention component 514 allows the neural network 520 to focus on certain features or inputs. The inputs to the decoder block 504 are added with the positional embeddings 510 forming context tensor 512. The decoder block predicts each token/subtoken $t_i$ in the target language one-by-one at each time step conditioned on all previously-generated target tokens/subtokens $t_1, \ldots t_{i-1}$. Hence, after the initial time step, the input embedding is shifted to the left.

The masked self-attention component 514 masks the output embeddings from future time steps. The feed-forward neural network 520 processes each output embedding separately. A layer normalization component 516, 522 is used between the layers in order to normalize the inputs across the features.

The linear layer 524 projects the vector produced by the stack of decoders into a logits vector. The softmax layer 526 then turns the scores of the logits vector into output probabilities 528 for each token/subtoken in the model's vocabulary.

The neural decoder transformer model 500 is pre-trained using unsupervised source code samples 532 using the pre-training engine 530 to learn to understand source code, the relationship between the source code elements in source code statements, and the syntax of the underlying source code language. The model 500 is then fined tuned using a fine-tuning engine 534 for the task of predicting repaired code from a vulnerable code snippet and its repaired code using a fine-tuning dataset 536.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 6:
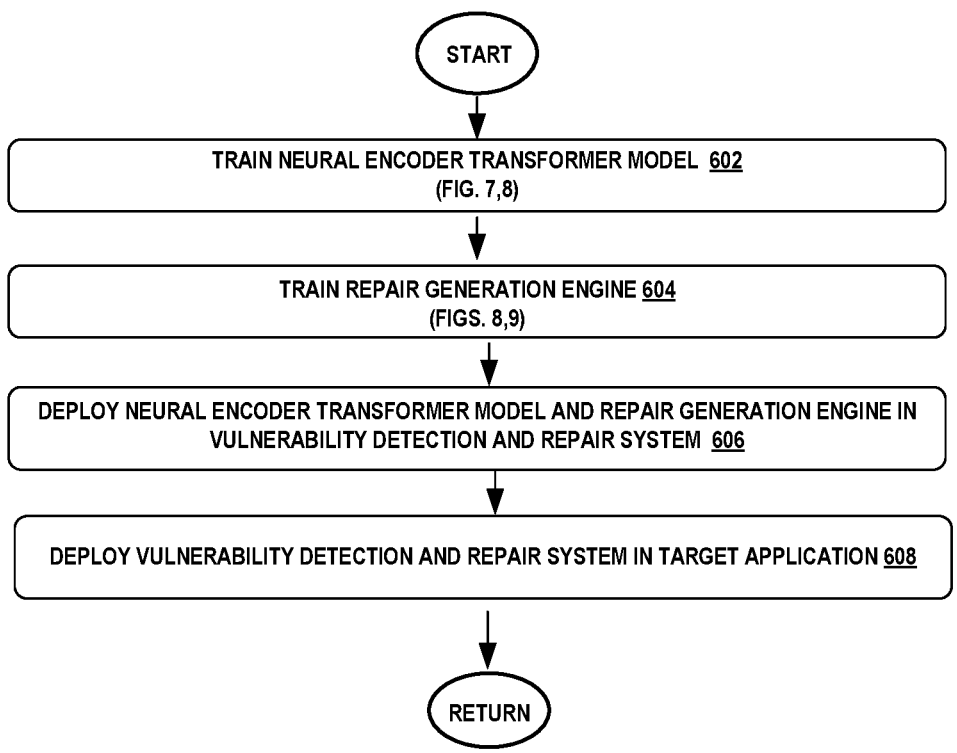
FIG. 6 is a flow diagram illustrating an exemplary method of the vulnerability detection and repair system.

FIG. 6 illustrates an exemplary method for implementing the vulnerability detection and repair system 600. Initially, the neural encoder transformer model is trained for the cybersecurity classification task (block 602). The neural decoder transformer model is trained to predict repaired code (block 604).

The neural encoder transformer model and the neural decoder transformer model are deployed in a vulnerability detection and repair system (block 606) that operates in a target application (block 608). The target application may be an IDE or source code editor as shown in FIG. 2, the target application may be a source code version control system as shown in FIG. 3, or other applications.

Figure 7:
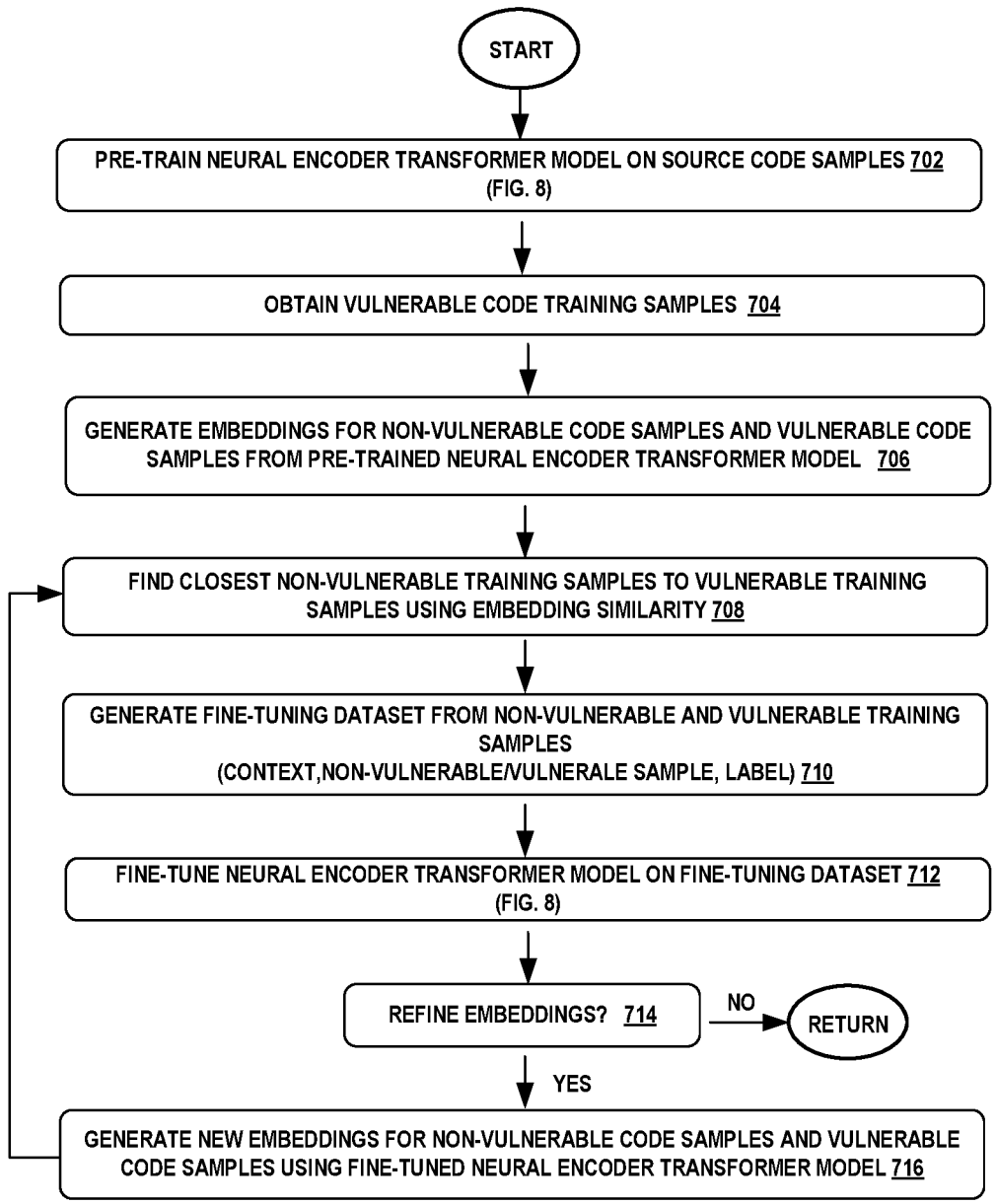
FIG. 7 is a flow diagram illustrating an exemplary method for training the classifier model.

Attention now turns to a more detailed discussion of the training of the neural encoder transformer model 700. Turning to FIG. 7, a pre-training dataset of unsupervised source code samples in one or more programming languages is obtained and used to train the neural encoder transformer model to learn the statistical properties of the source code, such as syntactic rules of the programming languages, as well as semantic information from co-occurrence of specific variable and method names (block 702).

The pre-training engine generates a pre-training dataset from a diverse corpus of unlabeled source code programs or files. In some aspects, the pre-training dataset may also include natural language text that pertains to a source code file such as source code summaries which describe the operation of a source code construct. This is referred to as unsupervised learning since the model draws inferences from the input data without labeled input. The pre-training engine extracts selected source code files from various source code repositories. The source code files contain context beyond method bodies, method signatures, and docstrings, such as imports, globals, comments, and scripts. (Collectively, block 702).

The pre-training engine transforms each of the selected source code files into a concrete syntax tree. The concrete syntax tree represents the source code text in the parsed form. The concrete syntax tree may also be a parse tree. A concrete syntax tree represents the syntactic structure of a program in a hierarchical or tree structure. The concrete syntax tree is an n-ary tree data structure that includes nodes that represent a construct in the grammar of the programming language of a program. The concrete syntax tree includes one root node, multiple internal nodes, and multiple terminal nodes. The terminal nodes represent the subtokens. A subtoken is a symbol that represents an operand or an operator. The concrete syntax tree differs from an abstract syntax tree where the terminal nodes represent operands. (Collectively, block 702).

The pre-training engine uses a subtokenizer to extract tokens/subtokens from the concrete syntax tree. In one aspect, the neural transformer models utilize a byte-level byte-pair encoding tokenizer to generate subtokens to represent ordered sequences of source code snippets. Unlike a natural language (e.g., English, etc.), programmers use, at times, arbitrary, complex and long names to represent a variable, function or other code elements which may result in an extremely large vocabulary for the model when a large number of source code programs are used to train the model. To reduce the size of the vocabulary, less-frequently occurring tokens are split into subtokens. A subtoken is a portion of a token that is in between a token and a single character. The subtokens are used to account for rare or unseen tokens (i.e., out-of-vocabulary tokens) that may appear in a target source code program. The use of the subtokens allows the model to learn and generate the out-of-vocabulary tokens. (Collectively, block 702).

Byte-level Byte-Pair Encoding (BBPE) is used to generate the vocabulary used by a neural transformer model. A text string, either a sequence of source code or a natural language text, is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. (Collectively, block 702).

The byte-level subwords are generated using the Byte Pair Encoding (BPE) algorithm. The vocabulary is seeded with 256 American Standard Code for Information Interchange (ASCII) characters and then greedily grown by adding the merge of the most common pair of consecutive tokens in each iteration. This type of encoding does not rely on knowing the underlying language making it suitable for an input sequence of text strings that contain source code and/or natural language text. The ordered sequences of UTF-8 bytes are translated into a T-ordered sequence of subtokens which are vector representations of a source code fragment or natural language text. The T-ordered sequence of subtokens is represented in a context vector. (Collectively, block 702).

Each source code program in the training dataset does need not be written in the same programming language. The training dataset may be composed of numerous source code programs, each of which may be written in a different programming language. Each source code program in the training dataset is encoded into a sequence composed of tokens and/or subtokens. The frequently-used elements in a programming language are encoded into tokens and the less frequently-occurring elements are encoded into combinations of characters referred to as subtokens. This reduces the need to store a large vocabulary and provides better accuracy for out-of-vocabulary tokens. For simplicity, the term subtoken shall include tokens and subtokens. (Collectively, block 702).

A noising transformation, such as a span masking function, is then applied to each sequence that randomly masks out a subset of subtokens and the masked span of subtokens is replaced with a mask subtoken, M The model is trained with the masked sequences to learn to reconstruct the original sequence without the masked subtokens. In one aspect, the mask subtoken replaces a span of subtokens. The number of text spans and the span lengths are randomly generated and each span is replaced with a single mask subtoken. The masked denoising is based on the doze task of evaluating human language-learners' proficiency, in which humans are given a foreign language with missing words, and are asked to correctly choose the missing word. The benefit of span-masking denoising in pre-training is that the model learns the desired language in an unsupervised fashion, but also is bi-directional in the sense that it learns the relationships of words both before and after their occurrence. (Collectively, block 702).

Figure 8:
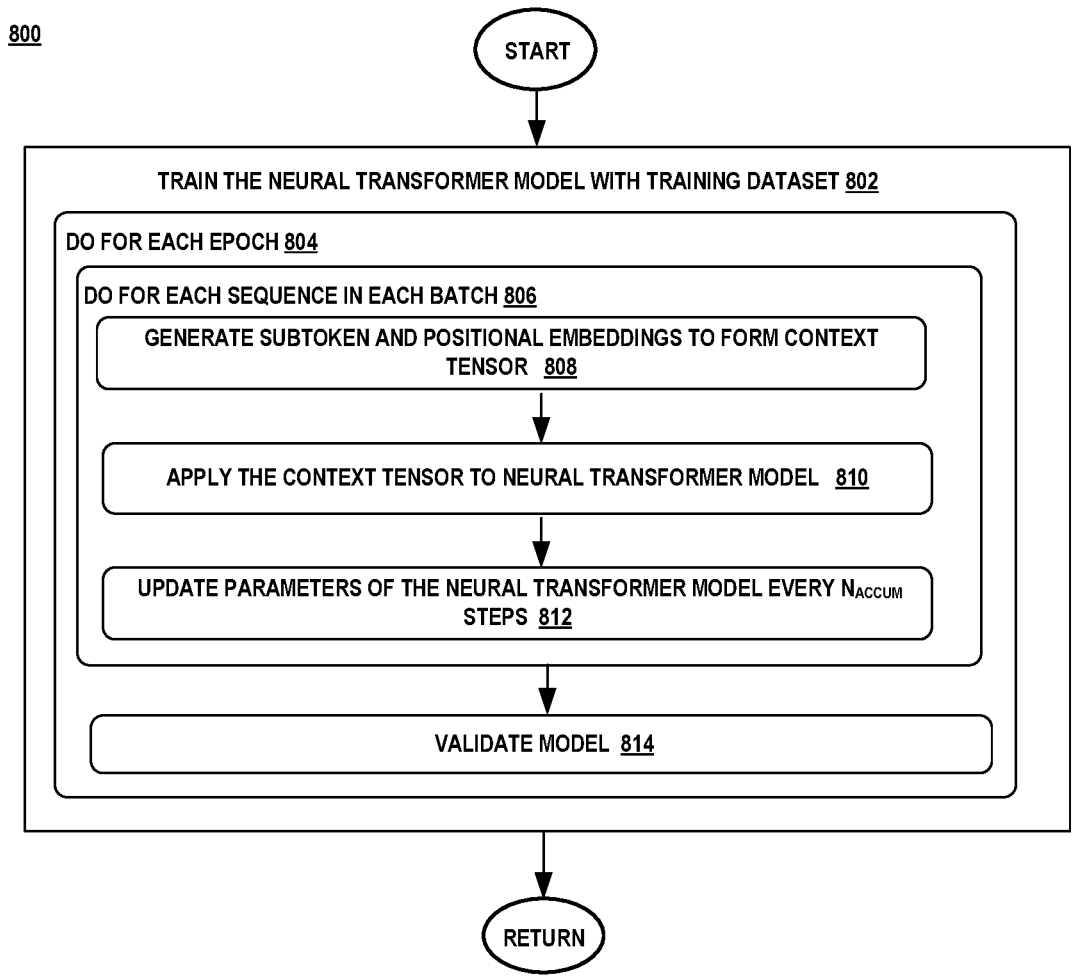
FIG. 8 is a flow diagram illustrating an exemplary training method of the neural encoder transformer model and the neural decoder transformer model.

Turning to FIG. 8, there is shown an exemplary method 800 for training a neural transformer model with a pre-training dataset and a fine-tuning dataset. This method can be applied by the pre-training engine and the fine-tuning engine to pre-train and fine-tune the neural encoder transformer model and/or the neural decoder transformer model.

Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 802).

A neural transformer model has multiple blocks and layers within each block so that more detailed relationships within the data are learned as well as how the features interact with each other on a non-linear level. The model architecture, training procedure, data normalization and vocabulary encoding procedures are hyperparameters that are tailored to meet a particular objective. The parameters of a model are the values of the model, such as the attention weights (K, V, Q) and the token embeddings (We, Wp). The hyperparameters influence the way the model is built and how the parameters are learned. (Collectively, block 802).

In one aspect, the hyperparameters may include the following: (1) the dimension of the subtoken and position embedding layers; (2) the configuration of the neural transformer model in a particular configuration with a number of encoder blocks and/or decoder blocks; (3) for the training procedure: the cross-entropy loss optimization objective; the sequence length; a mini-batch size; the gradient accumulation steps for each weight update; the stochastic optimization procedure used to train the feed-forward neural network; and the learning rate; (4) the data normalization procedure; and (5) the vocabulary encoding procedure: byte-level byte-pair encoding. (Collectively, block 802).

For each sequence of each batch of each epoch (blocks 804, 806), the T-ordered sequences of subtokens are then mapped into numeric vectors and then into respective subtoken embeddings and positional embeddings (block 808). An embedding is a learned representation for the text-based subtokens where subtokens that have a common meaning have a common representation. An embedding is a mapping of discrete categorical variables to a vector of continuous numbers. There is an embedding for each subtoken in the vocabulary and a corresponding positional embedding. The subtoken embedding represents the learned representation for the subtoken. The neural transformer model does not read each subtoken sequentially and as such, has no knowledge of the subtoken's position in a sequence without additional position information. The positional embedding is used to embed position information about a subtoken's position in a sequence into a respective neural transformer model.

Initial values are generated for the subtoken embedding and positional embeddings of each sequence which are then used to form a context tensor. Thereafter, the neural transformer model learns the values for each embedding. Upon the completion of the training phase, the embeddings for each subtoken and the positional embeddings are saved into respective matrices for later use. There is a subtoken embedding matrix, We, that contains an embedding vector for each subtoken $t_i$, i=0 . . . V, and a positional embedding matrix, Wp, that contains an embedding vector $P_j$, j=0 . . . T, for each position, where V is the size of the vocabulary and T is the length of the subtoken sequence. (Collectively, block 808).

The context tensor is input into a respective neural transformer model and passed through the multiple layers of the neural transformer model. For the encoder neural transformer model, the masked self-attention layer takes the context tensor as input and passes it through the multiple layers of self-attention, layer normalization and feed-forward neural network of each encoder block to finally produce a set of hidden representations. (Collectively, block 810).

The feed-forward neural networks in the encoder/decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation algorithm may be used to update the weights. (Collectively, block 810).

At the completion of each batch, the parameters of a respective neural transformer model are updated at a pre-configured frequency denoted as Naccum. Naccum is a gradient accumulation frequency. The parameters include the token/subtoken embeddings and the positional embeddings which are stored in a respective embedding matrix. (Collectively, block 812).

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 814).

Turning back to FIG. 7, vulnerable source code training samples are obtained from various sources, such as CodeQL, the CVEfixes dataset, and GitHub Issues data. CodeQL is a software analysis engine provided by GitHub that finds source code snippets in a specified codebase having a specified vulnerability. In one aspect, CodeQL is queried to find vulnerable source code having any one of the CVE and CWE vulnerabilities listed in Appendix A from various public source code repositories. The CVEfixes dataset is a relational database of publicly-known cybersecurity vulnerabilities and corresponding fixes. The data from the CVEfixes dataset is derived from CVE records in the public National Vulnerability Database (NVD). The NVD is a U.S. government repository of security-related software flows and other related information. (Collectively, block 704).

GitHub is an open source repository and toolset for collaboratively maintaining source code, and GitHub Issues is a forum for discussing any problems or questions related to specific source code in question. Maintainers of popular repositories usually classify such problems on their repository in GitHub Issues thereby confirming the validity of a raised issue which provides another source to build another dataset of known vulnerabilities found in open source software. (Collectively, block 704).

Additionally, a source code repository may be mined for source code snippets having been modified to correct a cybersecurity vulnerability. To find such source code snippets, the CodeQL program may be run on the commit history of a source code repository. The commit history shows the commits performed on a source code file of a repository. A commit is an operation that checks a modified version of the source code file back to the source code repository. The CodeQL program analyzes the modifications made to the source code program from each commit to identify a cybersecurity vulnerability and the original source code program containing the vulnerability. (Collectively, block 704).

For each vulnerable source code sample, several similar non-vulnerable code samples are obtained from the non-vulnerable embedding database. In one aspect, the pre-trained neural encoder transformer model is used to generate the embeddings of each vulnerable and non-vulnerable source code sample. (Collectively, block 706).

The vulnerable code embedding is then used to find the closest similar embeddings of the non-vulnerable source code in the non-vulnerable embedding database. The corresponding source code and context of each of the closest similar embeddings is used as the non-vulnerable source code samples for the fine-tuning dataset. (Collectively, block 708).

A fine-tuning dataset is then constructed from the non-vulnerable and vulnerable source code snippets. Each input sequence in the fine-tuning dataset includes the source code preceding the vulnerable or non-vulnerable source code snippet, referred to as a context, the vulnerable or non-vulnerable source code snippet, and a label. The label indicates either the vulnerable classification type or a pre-configured code indicating 'non-vulnerable source code.' (Collectively, block 710).

The fine-tuning dataset is split into input sequences for training, testing and validation subsets. The input sequences are constructed in the same manner as the pre-training dataset for the pre-trained model. Source code snippets are parsed to form a concrete syntax tree from which tokens/subtokens are extracted. Byte-level byte-pair encoding is used to form the subtokens. An ordered sequence of subtokens in formed with a corresponding context and label thereby forming a supervised fine-tuning dataset. (Collectively, block 712).

The fine-tuning dataset is then used to tune the weights or parameters of the neural encoder transformer model and each input sequence is applied to the neural encoder transformer model as described above with respect to FIG. 8 (block 712).

In the situation where the fine-tuned neural encoder transformer model is not performing as expected (block 714—yes), the model may be fine-tuned with a different fine-tuning dataset. The fine-tuned neural encoder transformer model may be used to generate new embeddings for the vulnerable source code samples and for the embeddings for the non-vulnerable source code stored in the non-vulnerable embedding database (block 716). The process then repeats by finding the closest similar non-vulnerable code based on the new embeddings and fine-tunes the neural encoder transformer model again with the new fine-tuning dataset (blocks 708-712). The process repeats until a convergence criterion is achieved.

Attention now turns to a more detailed description of the training of the repair generation model.

Figure 9:
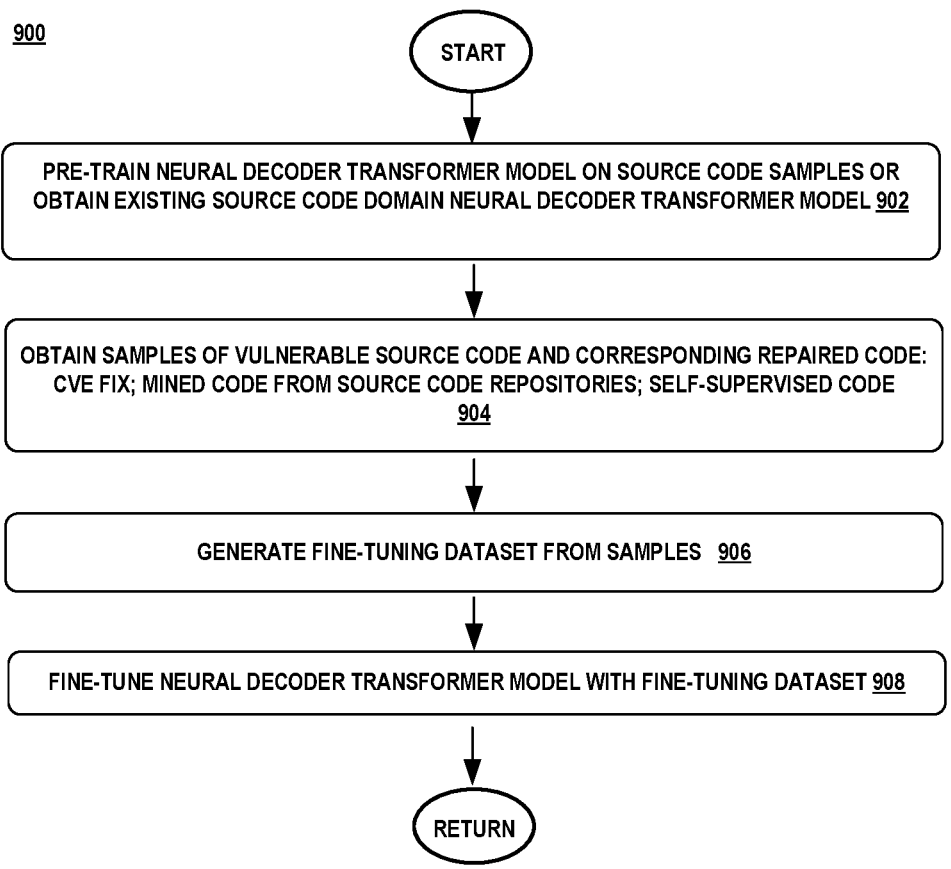
FIG. 9 is a flow diagram illustrating an exemplary training method of the repair generation model.

Turning to FIG. 9, there is shown an exemplary method of training the repair training generation model 900. In one aspect, the source code repair engine is configured as a neural decoder transformer model with attention. The neural decoder transformer model may be pre-trained with an unsupervised training dataset of source code snippets from source code programs known to have non-vulnerable source code. Alternatively, an existing neural decoder transformer model previously trained on source code snippets may be obtained thereby eliminating the need to pre-train a source code domain model. (Collectively, block 902).

The neural decoder transformer model is then fine-tuned on source code snippets having a software cybersecurity vulnerability and the source code that repaired the vulnerable code. The vulnerable source code snippet and its corresponding repaired code may be obtained from one or more of the following sources: the CVE fix dataset; source code mined from public source code repositories; and self-supervised training samples. The CVE fix dataset is a public set of cybersecurity vulnerabilities found in source code programs of different programming languages with an exemplary repaired version of the vulnerable code. The self-supervised training samples are created from non-vulnerable source code snippets which are modified to contain a cybersecurity vulnerability. The non-vulnerable source code snippet and the synthetic vulnerable code is used as part of the fine-tuning dataset. (Collectively, block 904).

Additionally, a source code repository may be mined for source code snippets having been modified to correct a cybersecurity vulnerability. The modified source code snippet and the original version of the code with the vulnerability is used as part of the fine-tuning dataset. To find such source code snippets, the CodeQL program may be run on the commit history of a source code repository. It should be noted that other source code analyzers, other than CodeQL, may be used, The commit history shows the commits performed on a source code file. A commit is an operation that checks in the source code repository a modified version of the source code file back to the source code repository. The CodeQL program analyzes the modifications made to the source code program from each commit to identify a cybersecurity vulnerability. When a cybersecurity vulnerability is identified, then the modified code is used as the repaired code and the original code is considered the vulnerable code. (Collectively, block 904).

The fine-tuning dataset is generated from each pair of vulnerable code and its corresponding non-vulnerable code (block 906). The fine-tuning dataset is then applied to the neural decoder transformer model in a similar manner shown and described with respect to FIG. 8 (block 908).

Figure 10:
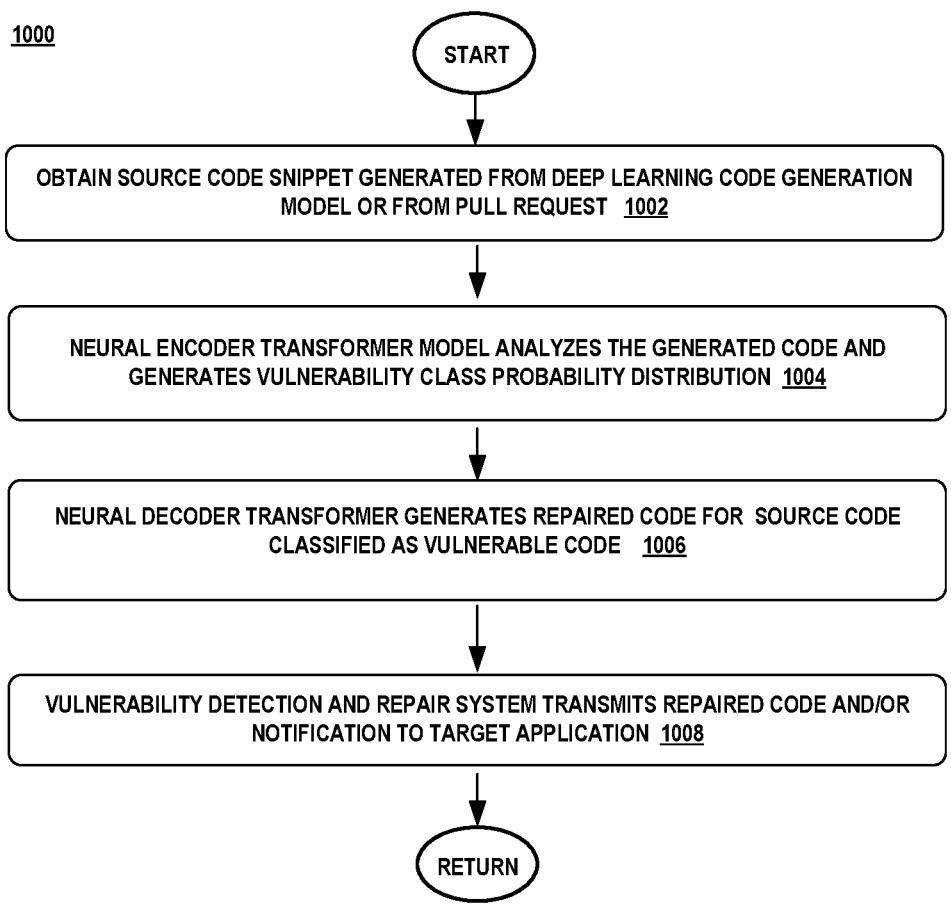
FIG. 10 is a flow diagram illustrating an exemplary method of the detection of a cybersecurity vulnerability and the generation of repair code.

FIG. 10 illustrates an exemplary method of the vulnerability detection and repair system 1000. The method receives source code to analyze for cybersecurity vulnerabilities. The source code may come from a deep learning code generation model or from a pull request (block 1002).

The pre-processing component parses the source code into a syntax tree, extracts tokens/subtokens from the tree to generate an input sequence of subtokens. Each token/subtoken in the input sequence is replaced with a corresponding token/subtoken embedding and the sequence of embeddings is applied to the classifier model. The classifier model generates a probability distribution of the cybersecurity vulnerability classes which is used to identify the likelihood of a vulnerability in the source code. (Collectively, block 1004).

The repair source code engine predicts the repaired source code for the source code snippet that is classified as vulnerable code. The source code repair engine parses the vulnerable code into a syntax tree, extract subtokens from the tree, which are tokenized, and then input into an input sequence. Each subtoken is replaced with a corresponding embedding to form the input embedding that is applied to the neural decoder transformer model. (Collectively, block 1006).

The source code repair engine uses a beam search to generate candidates as the repaired code. Each candidate is generated one token at a time at each timestep based on a conditional probability. The beam search uses the probability distribution generated by the neural decoder transformer model at each time step to identify the top k subtokens likely to be the next subtoken in a candidate sequence. The beam search expands the search by instantiating new partial sequences using each of the selected subtokens identified by the neural decoder transformer model's probability distribution. The search continues generating new partial sequences from the top k subtokens identified by the output distributions from the neural decoder transformer model until the search ends. The search may end when a completion token appears as the most probable next subtoken. A completion token signals when a partially-formed candidate sequence has been formed into a complete expression. A completion token may be an end-of-line, end-of-statement, end-of-method, or other completion subtoken. (Collectively, block 1006).

A beam search uses a breadth-first search to build a search tree. The search tree is composed of nodes at one or more inference levels. Each node represents a probability distribution generated by the neural decoder transformer model for the subtokens in the model vocabulary. At each level, only the top k subtokens having the highest probabilities from the output distribution generated by the neural decoder transformer model are expanded to the next inference level. The variable k is preconfigured and referred to as the beam width. Each of the k subtokens is then expanded into a search that updates the current context sequence with the selected subtoken to input into the neural decoder transformer model to generate an additional probability distribution for the next subtoken in a sequence. This process is repeated until a completion token, such as the end-of-line, end-of-statement, end-of-method, or other completion token is predicted as being the next likely subtoken candidate. (Collectively, block 1006).

The repaired code and/or a notification is then sent back to the target application (block 1008).

Technical Effect

Aspects of the subject matter disclosed herein pertain to the technical problem of identifying cybersecurity vulnerabilities in source code generated from a deep learning code generation model.

The technical features associated with addressing this problem is a classifier model trained to detect specific types of cybersecurity vulnerabilities and weaknesses in source code where the classifier model is trained from a training dataset that uses non-vulnerable source code that is closely aligned with source code having a known cybersecurity vulnerability. The use of the embeddings, generated from different stages of the classifier model, to determine closely similar non-vulnerable source code to a known vulnerable source code sample, improves the false positive rate of the model, or the precision of the model, as it is trained to be more discriminating when given a non-vulnerable code snippet which is very similar to a vulnerable snippet. This training allows the model to learn to make better predictions.

The technical effect achieved is the early detection of vulnerable code before the code is released. It is not always possible to know the type of data that a deep learning code generation model was trained on and the quality of the predicted source code. Even if the deep learning code generation model was trained on vulnerable code, the model may not always generate vulnerable code. The use of the techniques described herein account for the lack of information regarding the training datasets of a code generation model.

The training of a deep learning code generation model is a costly endeavor that consumes a considerable amount of computing resources and computing time. The techniques described herein permits the continued use of the code generation model regardless of the code used to train the model. In addition, the early detection of the vulnerable code reduces the computing resources and time needed to remedy the problems that may be caused by any vulnerable code remaining in the predicted source code.

Exemplary Operating Environment

Figure 11:
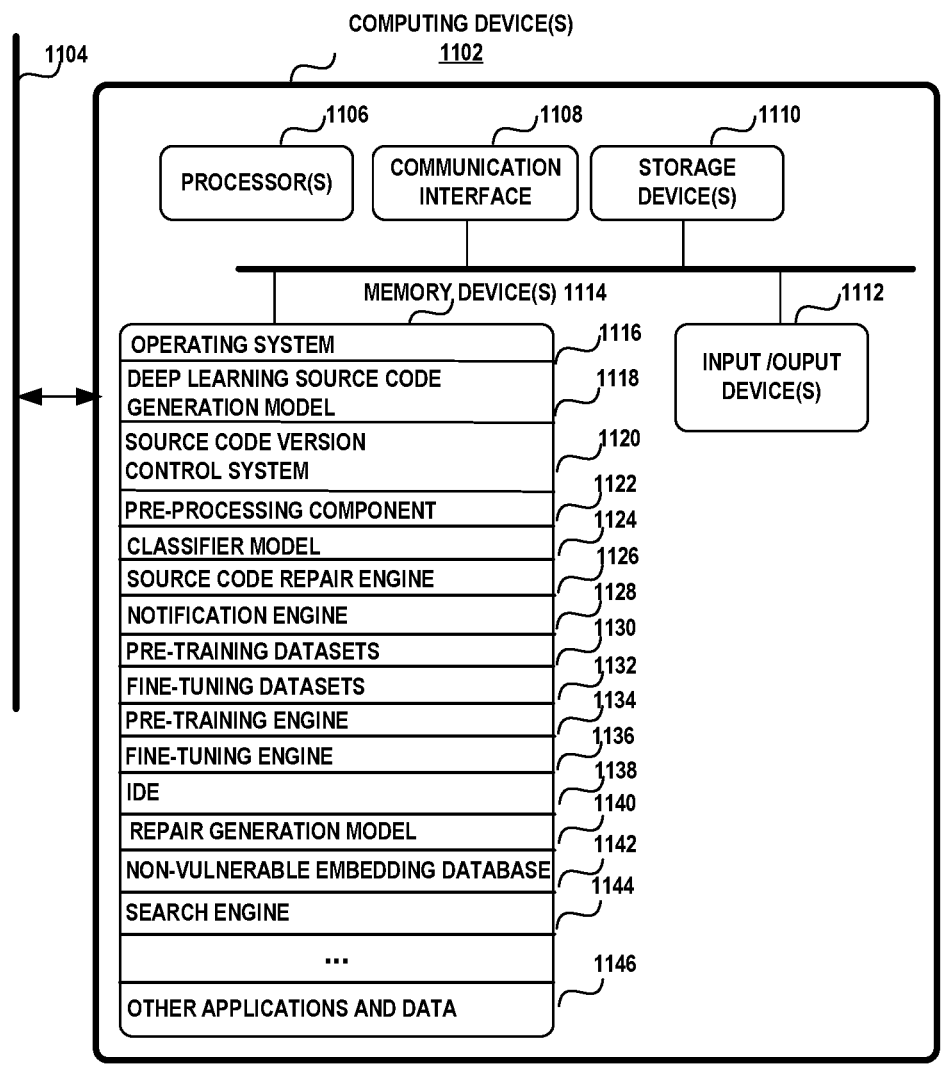
FIG. 11 is a block diagram illustrating an exemplary operating environment.

Attention now turns to a discussion of an exemplary operating environment 1100. FIG. 11 illustrates an exemplary operating environment 1100 having one or more computing devices 1102 communicatively coupled to a network 1104.

The computing devices 1102 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1100 may be configured in a network environment, a distributed environment, a multi-processor environment, or a stand-alone computing device having access to remote or local storage devices.

A computing device 1102 may include one or more processors 1106, one or more communication interfaces 1108, one or more storage devices 1110, one or more input/output devices 1112, and one or more memory devices 1114. A processor 1106 may be any commercially available or customized processor and may include dual microprocessors and multi-processor architectures. A communication interface 1108 facilitates wired or wireless communications between the computing device 1102 and other devices. A storage device 1110 may be computer-readable medium that does not contain propagating signals, such as modulated data signals transmitted through a carrier wave. Examples of a storage device 1110 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1110, in a computing device 1102. The input/output devices 1112 may include a keyboard, mouse, pen, voice input device, touch input device, display, speakers, printers, etc., and any combination thereof.

A memory device 1114 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 1114 may also include one or more external storage devices or remotely located storage devices that do not pertain to propagated signals, such as modulated data signals transmitted through a carrier wave.

The memory device 1114 may contain instructions, components, and data. A component is a software program that performs a specific function and is otherwise known as a module, program, component, and/or application. The memory device 1114 may include an operating system 1116, a deep learning source code generation model 1118, a source code version control system 1120, a pre-processing component 1122, a classifier model 1124, a source code repair engine 1126, a notification engine 1128, pre-training datasets 1130, fine-tuning datasets 1132, a pre-training engine 1134, a fine-tuning engine 1136, an IDE 1138, repair generation model 1140, non-vulnerable embedding database 1142, search engine 1144, and other applications and data 1146.

The computing device 1102 may be communicatively coupled via a network 1104. The network 1104 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 1104 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed comprising: one or more processors; and a memory that stores one or more programs that are configured to be executed by the one or more processors. The one or more programs including instructions that perform acts to: access a pre-trained neural classifier model; obtain at least one cybersecurity vulnerability source code sample and a plurality of non-vulnerable source code samples; generate an embedding for the at least one cybersecurity vulnerability source code sample and for each of the plurality of non-vulnerable source code samples; select ones of the plurality of non-vulnerable source code samples having an embedding similar to the embedding of the cybersecurity vulnerability source code sample; and fine-tune the pre-trained neural classifier model with the at least one cybersecurity vulnerability source code sample and the select ones of the plurality of non-vulnerable source code samples, wherein the fine-tuned neural classifier model learns to predict whether a given source code snippet includes non-vulnerable code or a cybersecurity vulnerability.

In an aspect, the pre-trained neural classifier model is trained with a plurality of unsupervised source code samples. In an aspect, the cybersecurity vulnerability includes at least one Common Vulnerability and Exposures (CVE) vulnerability. In an aspect, the cybersecurity vulnerability includes at least one Common Weakness Enumeration (CWE) vulnerability.

In an aspect, the one or more programs including instructions that perform acts to: utilize the pretrained neural classifier model to generate the embedding for the at least one cybersecurity vulnerability source code sample and for each of the plurality of non-vulnerable source code samples. In an aspect, the one or more programs include further instructions that perform acts to: utilize the fine-tuned classifier model to generate a second embedding for the at least one cybersecurity vulnerability source code sample and for each of the plurality of non-vulnerable source code samples; re-select ones of the plurality of non-vulnerable source code samples having a second embedding similar to the second embedding of the at least one cybersecurity vulnerability source code sample; and re-tune the fine-tuned classifier model with the at least one cybersecurity vulnerability source code sample and the re-selected ones of the plurality of non-vulnerable source code samples.

In an aspect, the one or more programs include further instructions that perform acts to: deploy the neural classifier model in an integrated development environment to identify vulnerable code predicted from a deep learning code generation model. In an aspect, the one or more programs include further instructions that perform acts to: deploy the neural classifier model in a source code version control system to identify vulnerable code in commit records. In an aspect, the neural classifier model is a neural encoder transformer model with attention.

A computer-implemented method is disclosed comprising: accessing a non-vulnerable embedding database having a plurality of embeddings, each of the embeddings associated with a non-vulnerable source code sample, the non-vulnerable source code sample associated with a non-vulnerable classification; generating an embedding for each of a plurality of vulnerable source code samples, each of the plurality of vulnerable source code samples associated with a vulnerability classification; for each of the plurality of vulnerable source code samples, searching in the non-vulnerable embedding database for a closest matching embedding; constructing a first fine-tuning dataset including the plurality of vulnerable source code samples and the non-vulnerable source code samples having the closest matching embedding to a respective vulnerable source code sample; and fine-tuning a pre-trained neural classifier model with the fine-tuning dataset to identify a likelihood of a given source code snippet associated with a vulnerability classification or a non-vulnerable classification.

In an aspect, the computer-implemented method further comprises: pre-training a neural classifier model on a plurality of unsupervised source code samples. In an aspect, the vulnerability classification includes at least one Common Vulnerability and Exposures (CVE) vulnerability and/or at least one Common Weakness Enumeration (CWE) vulnerability.

In an aspect, the computer-implemented method further comprises: generating each of the embeddings of the non-vulnerable source code samples in the non-vulnerable embedding database using the pre-trained neural classifier model. In an aspect, the computer-implemented method further comprises: re-generating the embeddings of the non-vulnerable source code samples and the vulnerable source code samples using the fine-tuned neural classifier model; re-selecting ones of the plurality of non-vulnerable source code samples having a regenerated embedding similar to the regenerated embedding of each of the cybersecurity vulnerability source code samples; and re-tuning the fine-tuned classifier model with the reselected non-vulnerable source code samples and the vulnerable source code samples having a similar re-generated embedding.

In an aspect, the pre-trained classifier model is a neural encoder transformer with attention.

A computer-implemented method is disclosed, comprising: obtaining a predicted source code snippet generated from a deep learning code generation model to complete a partially-formed source code snippet in a source code edit session; identifying through a neural classifier model a likelihood of the predicted source code snippet including vulnerable code; predicting using a neural transformer model, given the source code snippet, repaired code to remedy the predicted source code snippet including the vulnerable code; and displaying in the source code edit session the repaired code to complete the partially-formed source code snippet.

In an aspect, the vulnerable code is associated with a Common Vulnerability and Exposures (CVE) vulnerability. In an aspect, the vulnerable code is associated with a Common Weakness Enumeration (CWE) vulnerability. In an aspect, the neural transformer model is a neural decoder transformer model with attention. In an aspect, the neural classifier model is a neural encoder transformer model with attention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

APPENDIX A—SOFTWARE CYBERSECURITY VULNERABILITIES

CVE-2018-1281—Bind To All Interfaces
CWE-020—External APIs Used With Untrusted Data
CWE-020—Incomplete Hostname Reg Exp
CWE-020—Incomplete Url Scheme Check
CWE-020—Incomplete Url Substring Sanitization
CWE-020—Incorrect Suffix Check
CWE-020—Missing Reg Exp Anchor
CWE-020—Untrusted Data To External API
CWE-020—Useless Reg Exp Character Escape
CWE-020—ExternalAPIs—External APIs Used With Untrusted Data
CWE-020—ExternalAPIs—Untrusted Data To External API
CWE-022—Path Injection
CWE-022—Tainted Path
CWE-022—Tar Slip
CWE-022—Zip Slip
CWE-073—Template Object Injection
CWE-078—Command Injection
CWE-078—Indirect Command Injection
CWE-078—Shell Command Injection From Environment
CWE-078—Unsafe Shell Command Construction
CWE-078—Useless Use Of Cat
CWE-079—Exception Xss
CWE-079—Jinja2Without Escaping
CWE-079—Reflected Xss
CWE-079—Stored Xss
CWE-079—Unsafe Html Construction
CWE-079—Unsafe JQuery Plugin
CWE-079—Xss
CWE-079—Xss Through Dom
CWE-089—Sql Injection
CWE-090—Ldap Injection
CWE-094—Code Injection
CWE-094—Improper Code Sanitization
CWE-094—Unsafe Code Construction
CWE-094—Unsafe Dynamic Method Access
CWE-1004—Client Exposed Cookie
CWE-116—Bad Tag Filter
CWE-116—Double Escaping
CWE-116—Incomplete Html Attribute Sanitization
CWE-116—Incomplete Multi Character Sanitization
CWE-116—Incomplete Sanitization
CWE-116—Unsafe Html Expansion
CWE-117—Log Injection
CWE-1275—Same Site None Cookie
CWE-134—Tainted Format String
CWE-200—File Access To Http
CWE-200—Private File Exposure
CWE-201—Post Message Star
CWE-209—Stack Trace Exposure
CWE-215—Flask Debug
CWE-295—Disabling Certificate Validation
CWE-295—Missing Host Key Validation
CWE-295—Request Without Validation
CWE-300—Insecure Dependency Resolution
CWE-312—Build Artifact Leak
CWE-312—Cleartext Logging
CWE-312—Cleartext Storage
CWE-313—Password In Configuration File
CWE-326—Insufficient Key Size
CWE-326—Weak Crypto Key
CWE-327—Bad Randomness CWE-327—Broken Crypto Algorithm
CWE-327—Insecure Default Protocol
CWE-327—Insecure Protocol
CWE-327—Weak Sensitive Data Hashing
CWE-338—Insecure Randomness
CWE-346—Cors Misconfiguration For Credentials
CWE-347—Missing JWTKey Verification
CWE-352—Missing Csrf Middleware
CWE-367—File System Race
CWE-377—Insecure Temporary File
CWE-384—Session Fixation
CWE-400—Deep Object Resource Exhaustion
CWE-400—Remote Property Injection
CWE-451—Missing XFrame Options
CWE-502—Unsafe Deserialization
CWE-506—Hardcoded Data Interpreted As Code
CWE-598—Sensitive Get Query
CWE-601—Client Side Url Redirect
CWE-601—Server Side Url Redirect
CWE-601—Url Redirect
CWE-611—Xxe
CWE-614—Clear Text Cookie
CWE-640—Host Header Poisoning In Email Generation
CWE-643—Xpath Injection
CWE-730—Polynomial Re Do S
CWE-730—Re Do S
CWE-730—Reg Exp Injection
CWE-730—Regex Injection
CWE-730—Server Crash
CWE-732—Weak File Permissions
CWE-754—Unvalidated Dynamic Method Call
CWE-770—Missing Rate Limiting
CWE-776—Xml Bomb
CWE-798—Hardcoded Credentials
CWE-807—Conditional Bypass
CWE-807—Different Kinds Comparison Bypass
CWE-829—Insecure Download
CWE-830—Functionality From Untrusted Source
CWE-834—Loop Bound Injection
CWE-843—Type Confusion Through Parameter Tampering
CWE-862—Empty Password In Configuration File
CWE-912—Http To File Access
CWE-915—Prototype Polluting Assignment
CWE-915—Prototype Polluting Function
CWE-915—Prototype Polluting Merge Call
CWE-916—Insufficient Password Hash
CWE-918—Client Side Request Forgery
CWE-918—Full Server Side Request Forgery
CWE-918—Partial Server Side Request Forgery
CWE-918—Request Forgery

What is claimed:

1. A system comprising:
one or more processors; and
a memory that stores one or more programs that are configured to be executed by the one or more processors, the one or more programs including instructions that perform acts to:
access a pre-trained neural classifier model;
obtain at least one cybersecurity vulnerability source code sample and a plurality of non-vulnerable source code samples;
generate an embedding for the at least one cybersecurity vulnerability source code sample and for each of the plurality of non-vulnerable source code samples;
select ones of the plurality of non-vulnerable source code samples having an embedding similar to the embedding of the cybersecurity vulnerability source code sample; and
fine-tune the pre-trained neural classifier model with the at least one cybersecurity vulnerability source code sample and the select ones of the plurality of non-vulnerable source code samples, wherein the fine-tuned neural classifier model learns to predict whether a given source code snippet includes non-vulnerable code or a cybersecurity vulnerability.

2. The system of claim 1, wherein pre-trained neural classifier model is trained with a plurality of unsupervised source code samples.

3. The system of claim 1, wherein the cybersecurity vulnerability includes at least one Common Vulnerability and Exposures (CVE) vulnerability.

4. The system of claim 1, wherein the cybersecurity vulnerability includes at least one Common Weakness Enumeration (CWE) vulnerability.

5. The system of claim 1, wherein the one or more programs including instructions that perform acts to:
utilize the pretrained neural classifier model to generate the embedding for the at least one cybersecurity vulnerability source code sample and for each of the plurality of non-vulnerable source code samples.

6. The system of claim 1, wherein the one or more programs include further instructions that perform acts to:
utilize the fine-tuned classifier model to generate a second embedding for the at least one cybersecurity vulnerability source code sample and for each of the plurality of non-vulnerable source code samples;
re-select ones of the plurality of non-vulnerable source code samples having a second embedding similar to the second embedding of the at least one cybersecurity vulnerability source code sample; and
re-tune the fine-tuned classifier model with the at least one cybersecurity vulnerability source code sample and the re-selected ones of the plurality of non-vulnerable source code samples.

7. The system of claim 1, wherein the one or more programs include further instructions that perform acts to:
deploy the neural classifier model in an integrated development environment to identify vulnerable code predicted from a deep learning code generation model.

8. The system of claim 1, wherein the one or more programs include further instructions that perform acts to:
deploy the neural classifier model in a source code version control system to identify vulnerable code in commit records.

9. The system of claim 1, wherein the neural classifier model is a neural encoder transformer model with attention.

10. A computer-implemented method, comprising:
accessing a non-vulnerable embedding database having a plurality of embeddings, each of the embeddings associated with a non-vulnerable source code sample, the non-vulnerable source code sample associated with a non-vulnerable classification;
generating an embedding for each of a plurality of vulnerable source code samples, each of the plurality of vulnerable source code samples associated with a vulnerability classification;
for each of the plurality of vulnerable source code samples, searching in the non-vulnerable embedding database for a closest matching embedding;
constructing a first fine-tuning dataset including the plurality of vulnerable source code samples and the non-vulnerable source code samples having the closest matching embedding to a respective vulnerable source code sample; and fine-tuning a pre-trained neural classifier model with the fine-tuning dataset to identify a likelihood of a given source code snippet associated with a vulnerability classification or a non-vulnerable classification.

11. The computer-implemented method of claim 10, further comprising:

pre-training a neural classifier model on a plurality of unsupervised source code samples.

12. The computer-implemented method of claim 11, further comprising:

generating each of the embeddings of the non-vulnerable source code samples in the non-vulnerable embedding database using the pre-trained neural classifier model.

13. The computer-implemented method of claim 10, wherein the vulnerability classification includes at least one Common Vulnerability and Exposures (CVE) vulnerability and/or at least one Common Weakness Enumeration (CWE) vulnerability.

14. The computer-implemented method of claim 10, further comprising:

re-generating the embeddings of the non-vulnerable source code samples and the vulnerable source code samples using the fine-tuned neural classifier model;

re-selecting ones of the plurality of non-vulnerable source code samples having a regenerated embedding similar to the regenerated embedding of each of the cybersecurity vulnerability source code samples; and re-tuning the fine-tuned classifier model with the reselected non-vulnerable source code samples and the vulnerable source code samples having a similar re-generated embedding.

15. The computer-implemented method of claim 10, wherein the pre-trained classifier model is a neural encoder transformer with attention.

16. A computer-implemented method, comprising:

obtaining a predicted source code snippet generated from a deep learning code generation model to complete a partially-formed source code snippet in a source code edit session;

identifying through a neural classifier model a likelihood of the predicted source code snippet including vulnerable code;

predicting using a neural transformer model, given the source code snippet, repaired code to remedy the predicted source code snippet including the vulnerable code; and displaying in the source code edit session the repaired code to complete the partially-formed source code snippet.

17. The computer-implemented method of claim 16, wherein the vulnerable code is associated with a Common Vulnerability and Exposures (CVE) vulnerability.

18. The computer-implemented method of claim 16, wherein the vulnerable code is associated with a Common Weakness Enumeration (CWE) vulnerability.

19. The computer-implemented method of claim 16, wherein the neural transformer model is a neural decoder transformer model with attention.

20. The computer-implemented method of claim 16, wherein the neural classifier model is a neural encoder transformer model with attention.

* * * * *